US010401535B2

(12) United States Patent
Rogers et al.

(10) Patent No.: US 10,401,535 B2
(45) Date of Patent: Sep. 3, 2019

(54) ELECTRONIC DEVICES HAVING TRANSPARENT CRYSTALLINE STRUCTURES WITH ANTIREFLECTION COATINGS

(71) Applicant: Apple Inc., Cupertino, CA (US)

(72) Inventors: Matthew S. Rogers, San Jose, CA (US); Naoto Matsuyuki, Tokyo (JP); Que Anh S. Nguyen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/617,706

(22) Filed: Jun. 8, 2017

(65) Prior Publication Data

US 2018/0024274 A1    Jan. 25, 2018

Related U.S. Application Data

(60) Provisional application No. 62/366,391, filed on Jul. 25, 2016.

(51) Int. Cl.
*G02B 1/113* (2015.01)
*G02B 1/02* (2006.01)

(52) U.S. Cl.
CPC .............. *G02B 1/113* (2013.01); *G02B 1/02* (2013.01)

(58) Field of Classification Search
CPC .............. G02B 3/0087; G02B 6/02038; G02B 2006/12095; G02B 1/11; G02B 1/02
USPC .................................................. 359/652–655
See application file for complete search history.

(56) References Cited

U.S. PATENT DOCUMENTS

| 8,553,333 | B2 | 10/2013 | Chang et al. |
| 9,341,751 | B2 | 5/2016 | Kalyankar et al. |
| 2006/0148971 | A1* | 7/2006 | Jing ................. C08J 3/005 524/520 |
| 2010/0102251 | A1* | 4/2010 | Ferrini ................. G02B 5/02 250/484.4 |
| 2010/0259823 | A1 | 10/2010 | Xi et al. |

(Continued)

OTHER PUBLICATIONS

Influence of localized surface plasmon excitation in silve rnanoparticles on the performance of silicon solar cells, Temple et al. Solar Energy Materials & Solar Cells 93 (2009)1978-1985, Aug. 11, 2009.*

*Primary Examiner* — Stephone B Allen
*Assistant Examiner* — Travis S Fissel
(74) *Attorney, Agent, or Firm* — Treyz Law Group, P.C.; G. Victor Treyz; David K. Cole

(57) ABSTRACT

A graded index antireflection layer may be formed on a transparent crystalline member such as a sapphire member. The graded index layer may include aluminum oxide and silicon oxide. The graded index layer may extend from a first surface at the transparent member to a second surface. The fraction of aluminum oxide in the graded index layer may be at a maximum at the first surface so that the index of refraction of the graded index layer at the first surface matches the index of refraction of the transparent member and may be at a minimum at the second surface so the index of refraction of the graded index layer is minimized at the second surface. The graded index layer may be annealed to form aluminum oxide nanocrystals in the graded index layer and to form a polycrystalline aluminum oxide adhesion layer at the first surface.

20 Claims, 6 Drawing Sheets

(56) References Cited

U.S. PATENT DOCUMENTS

| | | | |
|---|---|---|---|
| 2011/0222006 A1* | 9/2011 | Imanishi | G02F 1/1337 |
| | | | 349/124 |
| 2014/0168493 A1* | 6/2014 | Wang | G02B 5/3083 |
| | | | 348/333.01 |
| 2014/0320728 A1* | 10/2014 | Sugiyama | C03C 15/00 |
| | | | 348/340 |
| 2015/0062963 A1* | 3/2015 | Meir | G02B 6/005 |
| | | | 362/607 |
| 2015/0077646 A1 | 3/2015 | Chen et al. | |
| 2015/0118441 A1* | 4/2015 | Shang | F01D 5/284 |
| | | | 428/141 |
| 2016/0220099 A1* | 8/2016 | Schouwink | A61B 1/00096 |
| 2016/0225962 A1* | 8/2016 | Manion | H01L 33/56 |
| 2016/0366777 A1 | 12/2016 | Rogers et al. | |

* cited by examiner

ELECTRONIC DEVICES HAVING TRANSPARENT CRYSTALLINE STRUCTURES WITH ANTIREFLECTION COATINGS

This application claims the benefit of provisional patent application No. 62/366,391, filed Jul. 25, 2016, which is hereby incorporated by reference herein in its entirety.

BACKGROUND

This relates generally to antireflection coatings, and, more particularly, to antireflection coatings for transparent structures in electronic devices.

Electronic devices such as cellular telephones, computers, watches, and other devices contain transparent members such as display cover layers and camera windows. Transparent members such as these may be prone to undesired light reflections. Light reflections in display cover layers can obscure images that are being presented on a display. Light reflections in camera windows can create undesired image artifacts.

Light reflections such as these arise because there is an index of refraction difference between the material from which a transparent member is formed and surrounding air. To help reduce reflections, transparent members may be provided with antireflection coatings formed from a stack of alternating high-index-of-refraction and low-index-of-refraction dielectric layers. These antireflection coatings may be sensitive to angular orientation during operation and may be prone to delamination if scratched.

It would therefore be desirable to be able to provide improved antireflection coatings for transparent members in electronic devices.

SUMMARY

An electronic device may be provided with a transparent member such as a display cover layer or a camera window. The transparent member may be formed from a crystalline material such as sapphire. A graded index layer may be formed on the transparent member and may serve as an antireflection coating.

The graded index layer may include varying proportions of aluminum oxide and silicon oxide. The graded index layer may extend from a first surface at the transparent member to a second surface. The fraction of aluminum oxide in the graded index layer may be at a maximum at the first surface so that the index of refraction of the graded index layer at the first surface matches the index of refraction of the transparent member and may be at a minimum at the second surface so the index of refraction of the graded index layer is minimized to suppress reflections at the second surface.

The graded index layer may be annealed to form aluminum oxide nanocrystals in the graded index layer and to form a polycrystalline aluminum oxide adhesion layer at the first surface. The nanocrystals help harden the graded index layer. The adhesion layer helps prevent delamination of the graded index layer.

DETAILED DESCRIPTION

Electronic devices and other items may be provided with transparent structures such as sapphire and other transparent crystalline materials. Antireflection coatings may be formed on the transparent structures to reduce light reflections. Illustrative configurations in which antireflection coatings are provided on transparent members for electronic devices such as transparent layers in displays and windows for cameras and other light-based devices may sometimes be described herein as an example. In general, however, antireflection coatings may be formed on any suitable transparent members.

Figure 1:
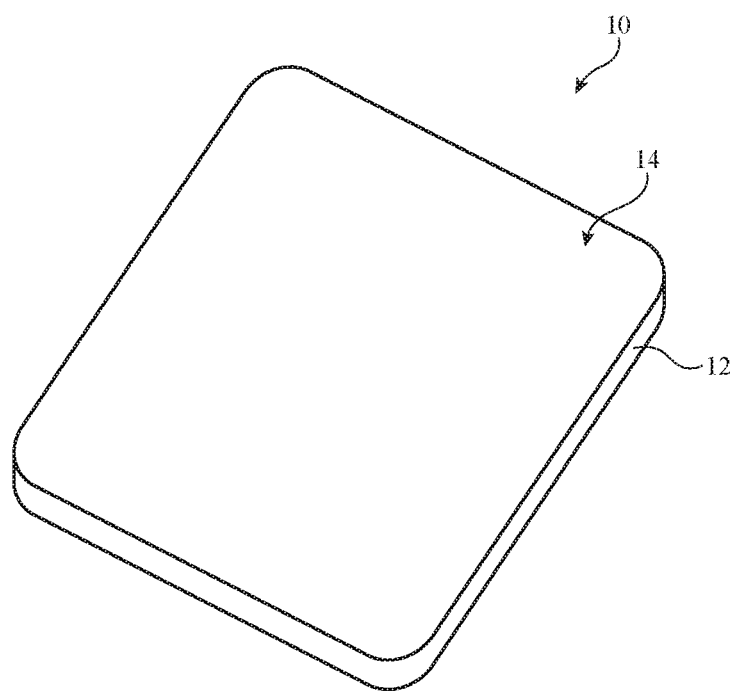
FIG. 1 is a perspective view of an illustrative electronic device of the type that may include transparent members with antireflection coatings in accordance with an embodiment.

An illustrative electronic device of the type that may be provided with transparent members having antireflection coatings is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wristwatch device (e.g., a watch with a wrist strap), a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, wrist device, or other portable computing device. Other configurations may be used for device 10 if desired. The example of FIG. 1 is merely illustrative.

In the example of FIG. 1, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, titanium, gold, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies.

Display 14 may include one or more layers of transparent material. For example, the outermost layer of display 14, which may sometimes be referred to as a display cover layer, may be formed from a hard transparent material help protect display 14 from damage. Illustrative configurations in which a display cover layer and other transparent members in device 10 (e.g., windows for cameras and other light-based devices) are formed from a hard transparent crystalline material such as sapphire (sometimes referred to as corundum or crystalline aluminum oxide) may be described herein as an example. Sapphire makes a satisfactory material for display cover layers and windows due to its hardness (9 Mohs). In general, however, these transparent members may be formed from any suitable material.

A display cover layer for display 14 may planar or curved and may have a rectangular outline, a circular outline, or outlines of other shapes. If desired, openings may be formed in the display cover layer. For example, an opening may be formed in the display cover layer to accommodate a button, a speaker port, or other component. Openings may be formed in housing 12 to form communications ports (e.g., an audio jack port, a digital data port, etc.), to form openings for buttons, or to form audio ports (e.g., openings for speakers and/or microphones).

Figure 2:
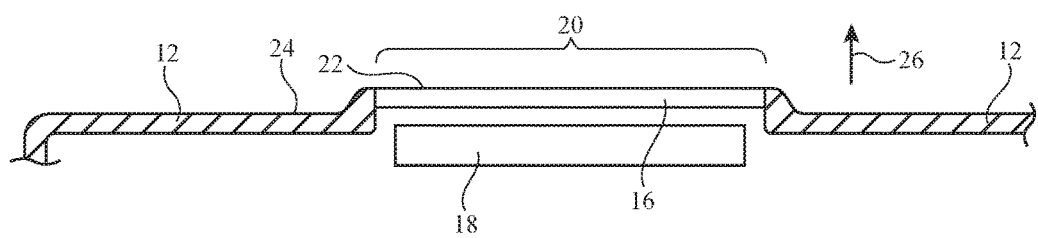
FIG. 2 is a cross-sectional side view of an illustrative electronic device window such as a camera window that may be provided with an antireflection coating in accordance with an embodiment.

Antireflection coatings may be formed on display cover layers to reduce reflections and thereby help users view images on display 14. Antireflection coatings may also be formed on transparent windows in device 10. A cross-sectional side view of an illustrative window in a portion of device 10 is shown in FIG. 2. As shown in FIG. 2, device 10 may have housing 12. Light-based component 18 may be mounted in alignment with opening 20 in housing 12. Opening 20 may be circular, may be rectangular, may have an oval shape, may have a triangular shape, may have other shapes with straight and/or curved edges, or may have other suitable shapes (outlines when viewed from above). Window 16 may be mounted in opening 20 of housing 12 so that window 16 overlaps component 18. A gasket, bezel, adhesive, screws, or other fastening mechanisms may be used in attaching window 16 to housing 12. Surface 22 of window 16 may lie flush with surface 24 of housing 12, may be recessed below surface 24, or may, as shown in FIG. 2, be proud of surface 24 (i.e., surface 22 may lie in a plane that is some distance away from surface 24 in direction 26). Surface 24 may form the rear face of housing 12 or other suitable portion of housing 12.

Light-based device 18 may be based on one or more components that emit light (e.g., a light-emitting diode, a laser, a lamp, etc.) and/or one or more components that detect light (e.g., an image sensor that captures digital images through a lens, a proximity sensor detector that measures infrared light from an infrared emitter that has reflected off of external objects adjacent to device 10, an ambient light sensor that measures the intensity and/or color of ambient light, or other light producing and/or light measuring circuitry). With one illustrative configuration, window 16 is a circular window and device 18 includes a rectangular image sensor and a lens that is interposed between the circular window and the rectangular image sensor. Other types of light-based devices may be aligned with windows such as illustrative window 16 of FIG. 2. The configuration of FIG. 2 is merely illustrative.

Transparent members for device 10 such as a display cover glass in display 14 or window 16 may be formed from a durable material such as sapphire or other hard crystalline materials. Hard materials (particularly materials such as sapphire with a Mohs hardness of 9 or more, but also materials that are softer such as materials with a hardness of 8 Mohs or more or other suitable hard materials) will tend to resist scratches when the transparent members are subject to wear from normal use. Illustrative configurations in which the transparent members for device 10 (e.g., display cover layers for displays such as display 14, windows such as window 16 of FIG. 2, etc.) are formed from sapphire (i.e., crystalline aluminum oxide) are sometimes be described herein as an example. In general, these transparent structures may be formed from any suitable materials.

Sapphire has a relatively large refractive index (1.8), which causes sapphire structures to reflect light. Light reflections can make it difficult to view images on display 14 and can interfere with image capture operations and other operations using windows 16. To suppress light reflections, transparent sapphire members may be provided with antireflection coatings. The antireflection coatings may be configured to resist scratching.

Figure 3:
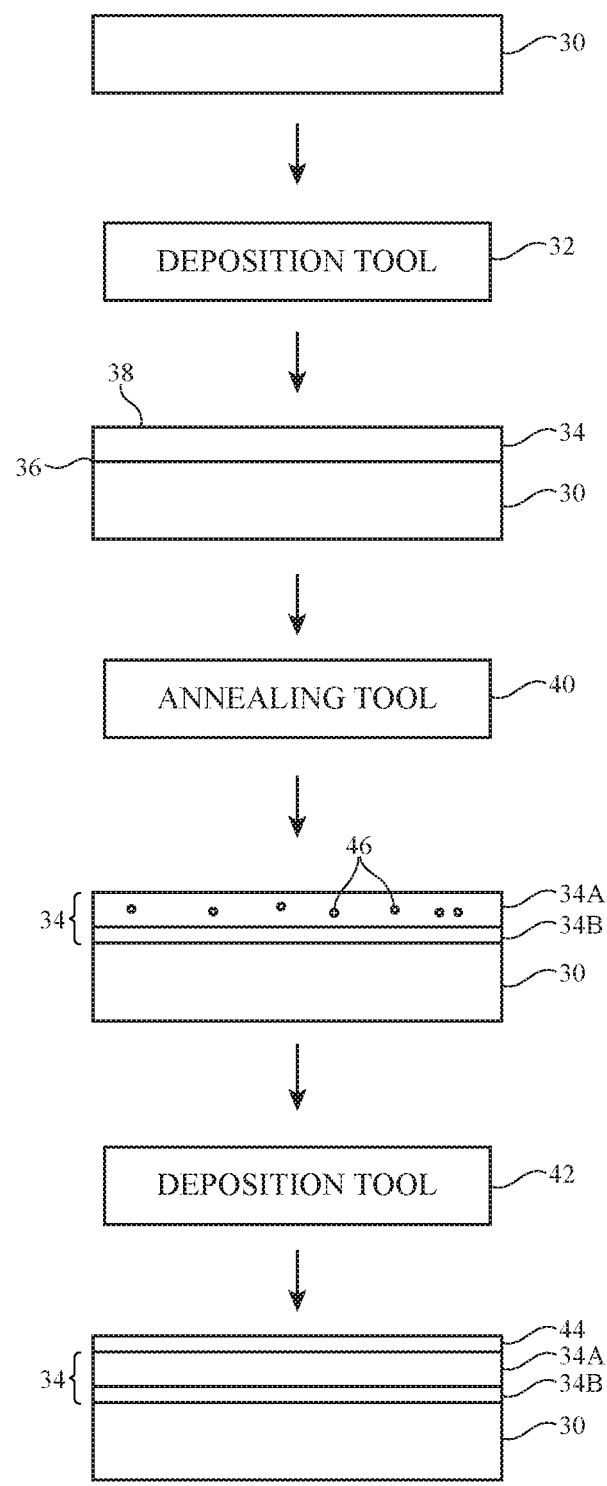
FIG. 3 is a diagram of illustrative equipment and operations involved in forming a transparent member with an antireflection coating in accordance with an embodiment.

FIG. 3 is a diagram of illustrative equipment and operations that may be used to provide a sapphire member with an antireflection coating that resists scratching. As shown in FIG. 3, deposition tool 32 may be used to deposit thin-film layer 34 on sapphire member 30 (or other suitable crystalline substrate). Sapphire member 30 may be a planar layer of material or other suitable sapphire structure. Deposition tool 32 may be a sputtering tool, an evaporator, other physical vapor deposition equipment, a chemical vapor deposition tool, or other equipment for depositing layer 34. The thickness of layer 34 may be about 100 nm, less than 150 nm, more than 50 nm, or other suitable thickness. Layer 34 may be an inorganic dielectric layer formed from materials such as aluminum oxide and silicon oxide and/or other inorganic dielectric materials.

To form an antireflection coating, the index of refraction of layer 34 may be varied continuously (i.e., layer 34 may be a gradient-index layer, sometimes referred to as a graded index layer). For example, layer 34 may be formed from aluminum oxide and silicon oxide in proportions that vary as a function of distance between the surfaces of layer 34. At boundary 36 between layer 34 and member 30 (i.e., at an interface formed at a first surface of layer 34), layer 34 may be composed of entirely (or nearly entirely) aluminum oxide ($Al_2O_3$) so that the index of refraction of layer 34 matches the index of refraction of member 30. At surface 38 of layer 34 (i.e., at a second surface of layer 34 such as at an interface between layer 34 and air or at an interface between layer 34 and an overlapping coating), layer 34 may be formed entirely (or nearly entirely) of silicon oxide ($SiO_2$), thereby minimizing the index of refraction of layer 34 at the second surface. To provide layer 34 with a desired gradient-index profile, the ratio of aluminum oxide to silicon oxide can be varied as a function of distance above interface 36 (i.e., the amount of silicon oxide that is present in layer 34 can be gradually increased while the amount of aluminum oxide that is present in layer 34 can be gradually decreased). The index of refraction of aluminum oxide is about 1.8 and the index of refraction of silicon oxide is about 1.5. By forming a gradient-index layer such as layer 34, reflections of light from member 30 can be reduced.

To enhance the adhesion and strength of layer 34, member 30 and layer 34 may be annealed using annealing tool 40. Annealing tool 40 may be a furnace or other tool that can heat member 30 and layer 34 to an elevated temperature such as 1200° C., more than 1100° C., less than 1500° C., or other suitable temperature. The temperature to which member 30 and layer 34 are heated during annealing is preferably below the melting point of member 30 (i.e., 1600° C.) but sufficiently high to cause crystals of aluminum oxide to segregate from amorphous materials in layer 34. Member 30 and layer 34 may be annealed for 2 hours, more than 30 minutes, less than 4 hours, or other suitable annealing time.

During annealing, a portion of layer 34 near interface 36 with member 30 (i.e., a first surface of layer 34) may crystallize, thereby forming a polycrystalline layer such as layer 34B (e.g., a polycrystalline aluminum oxide layer). Layer 34 may be 5-20 nm thick, may be more than 5 nm thick, may be less than 20 nm thick, or may have any other suitable thickness. Due to densification of layer 34 and diffusion that takes place during annealing, the annealing process may cause the thickness of layer 34 to be reduced from about 100 nm (or more than 50 nm or less than 150 nm) to about 80 nm (or more than 30 nm, or less than 130 nm) during annealing. Polycrystalline layer 34B may contain crystalline grains of aluminum oxide of about 3-6 nm in size (diameter), more than 2 nm in size, less than 10 nm in size, etc. Polycrystalline layer 34B may serve as an adhesion layer that helps secure portion 34A of layer 34 to member 30 (e.g., by reducing the risk of delamination of layer 34 at interface 36).

Annealing with tool 40 may also cause isolated crystals 46 of aluminum oxide to form in portion 34A of layer 34. These crystals, which may sometimes be referred to as nanoparticles or nanocrystals may be less than 10 nm in size or other suitable size and may help harden and strengthen layer 34. The nanocrystals in layer 34 and the crystalline aluminum oxide of member 30 may have the same crystal orientation.

Following annealing, deposition tool 42 may be used to deposit one or more layers such as layer 44 on layer 34. Layer 44 may be an oleophobic layer that helps prevent smudging on layer 34. Deposition tool 42 may include physical vapor deposition equipment, chemical vapor deposition equipment, equipment for printing or spraying material onto layer 34, or other suitable equipment for depositing layer 44 on layer 34. For example, tool 42 may be an evaporator and layer 44 may be an evaporated oleophobic layer formed from a polymer such as a fluoropolymer.

Figure 4:
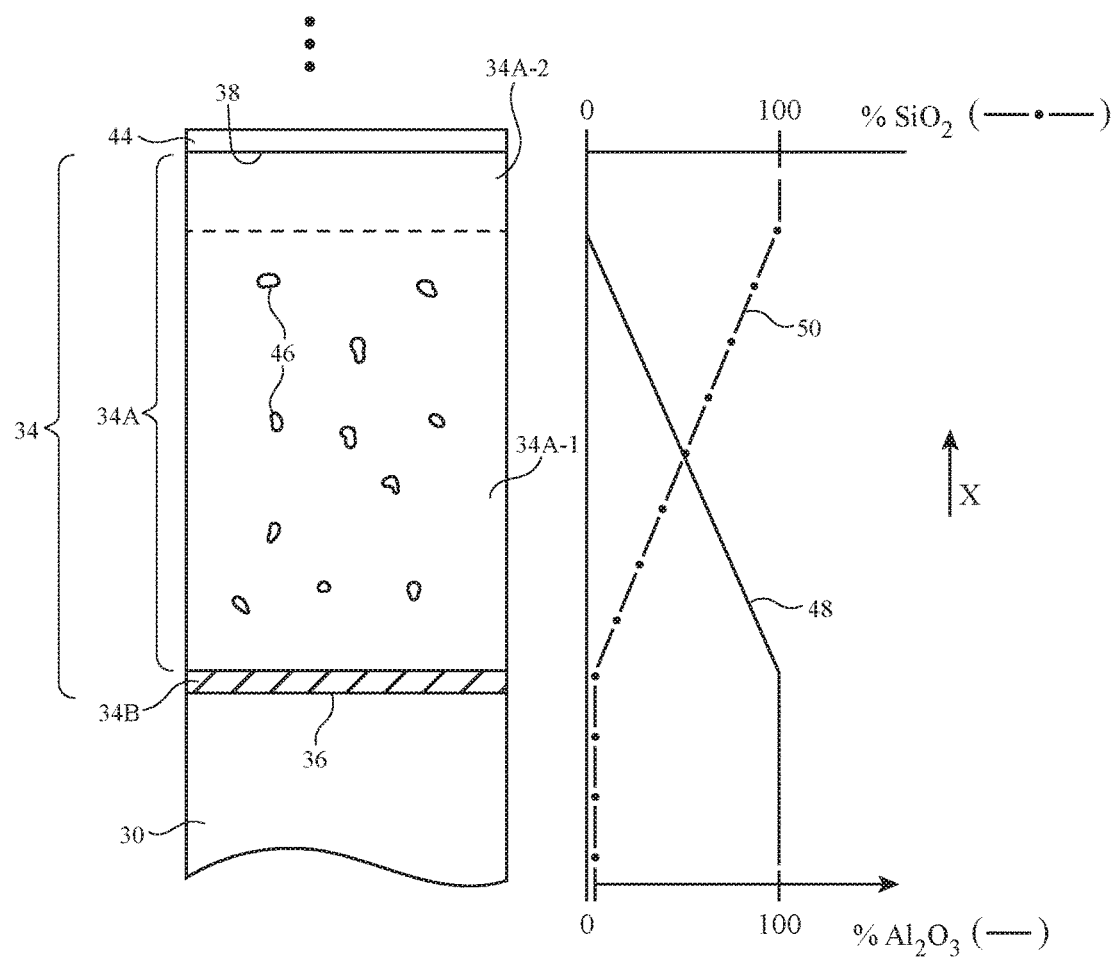
FIG. 4 is a diagram of an illustrative antireflection layer on a transparent member and a graph showing how the composition of the antireflection layer can be gradually varied as a function of position within the layer in accordance with an embodiment.

FIG. 4 is a diagram showing layers that may be formed on member 30 using equipment of the type shown in FIG. 3. As shown in FIG. 4, layer 34 may extend from a first surface at interface 36 with member 30 to a second surface on which layer 44 is formed. Following annealing, polycrystalline aluminum oxide layer 34B may be formed at interface 36 between layer 34 and member 30 (i.e., at the first surface of layer 34). Layer 34B may serve as an adhesion layer that helps to secure layer 34 to member 30.

The graph on the right side of FIG. 4 shows illustrative concentrations of aluminum oxide (curve 48) and silicon oxide (curve 50) in layer 34 as a function of distance X through layer 34. As shown by curve 48, the relative fraction of aluminum oxide in layer 34 decreases as a function of increasing distance X from interface 36 while, as shown by curve 50, the relative fraction of silicon oxide in layer 34 increases by a corresponding amount as a function of increasing distance X.

At interface 36, layer 34 is composed of 100% aluminum oxide and 0% silicon oxide, so that the index of refraction of layer 34 matches the index of refraction of member 30 and reflections at interface 36 are minimized. At upper surface 38 of layer 34, layer 34 is composed of 100% silicon oxide and 0% aluminum oxide. Because layer 34 is formed from silicon oxide (index of 1.5) at surface 38 instead of aluminum oxide at surface 38 (index 1.8), reflections at surface 38 are reduced. Because layer 34 is formed of aluminum oxide at interface 36, layer 34 is formed from the same material as member 30 at interface 36, which helps ensure that layer 34 adheres to member 30. Reflections within layer 34 due to abrupt changes in the index of refraction of layer 34 are avoided by smoothly altering the composition of layer 34 and therefore the refractive index of layer 34 as a function of distance X.

The index of refraction of layer 34A may be graded throughout the entirety of layer 34A or, if desired, may be graded only through lower portion 34A-2 of layer 34A (i.e., upper portion 34A-1 of layer 34A may be formed from pure silicon oxide). The inclusion of silicon oxide in portion 34A-2 may help in adhering oleophobic layer 44 to layer 34 and/or may help render the surface of layer 34 oleophobic (e.g., so that layer 44 can be omitted).

During the annealing process in which layer 34 is annealed using annealing tool 40 (FIG. 3), aluminum oxide nanocrystals such as crystals 46 may form in layer 34A. Crystals 46 may have a size (diameter) of about 7.5 nm, more than 5 nm, less than 10 nm, or other suitable size. The presence of particulates (segregates) such as nanocrystals 46 may help harden and thereby strengthen layer 34. The hardness of layer 34 and the adhesion of layer 34 may help make layer 34 resistant to damage from scratches.

The color of layer 34 and, if desired, the reflectivity of layer 34, may be modified by depositing one or more additional layers of material on layer 34. For example, one or more thin-film dielectric layers such as high refractive index materials (e.g., niobium oxide, titanium oxide, etc.) alternated with one or more low refractive index materials (e.g., silicon oxide) may be formed on surface 38 below oleophobic coating layer 44 or in place of coating layer 44. These layers may form a thin-film filter that serves as a thin-film antireflection layer and/or that serves as a color adjustment layer that adjusts the appearance of layer 34. For example, thin-film inorganic dielectric layers such as these (e.g., two to three layers, more than two layers, or other suitable number of layers) may be used to convert layer 34 from a reddish color to a bluish color. The thicknesses of the thin-film layers (which are typically on the order of a wavelength of light or less) may be selected based on the desired color properties of the layers, the desired antireflection properties of the layers, the number of layers that are present, and the index of refraction for each thin-film layer. In some situations, it may be desirable to minimize the thickness of any additional layers such as these on surface 38 under coating 44, because the graded index material of layer 34 is able to serve as an antireflection layer and the inclusion of a large number of additional layers may create delamination vulnerabilities. Accordingly, it may be desirable to use additional layers such as these in relatively small numbers (e.g., 2-3 layers). Configurations in which more dielectric layers are added on top of layer 34 may also be used, if desired.

Figure 5:
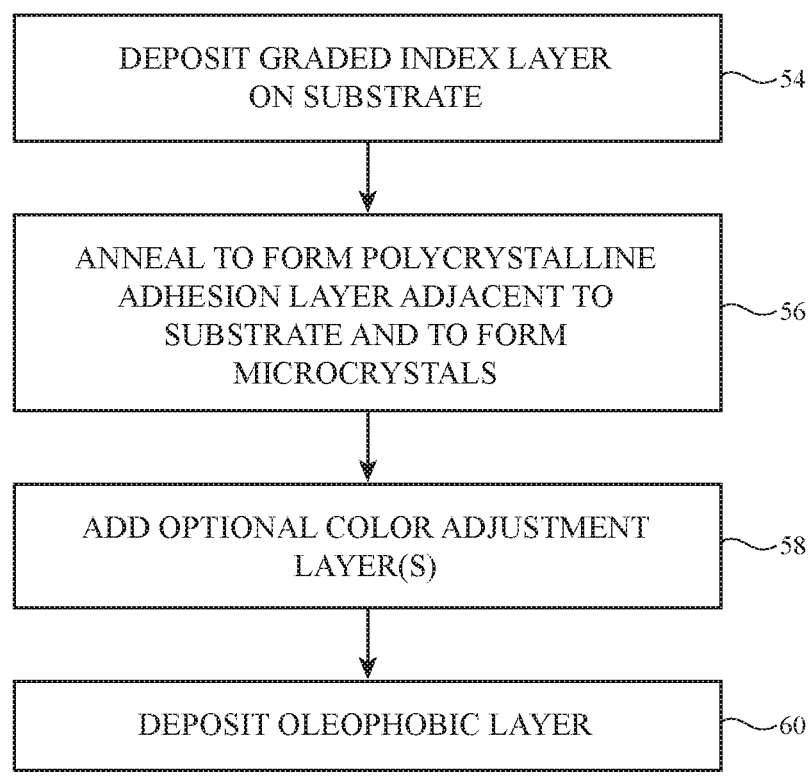
FIG. 5 is a flow chart of illustrative steps involved in forming an antireflection layer in accordance with an embodiment.

FIG. 5 is a flow chart of illustrative operations involved in forming an antireflection coating from an annealed graded index layer on a crystalline substrate such as a sapphire member.

At step 54, a graded index layer such as layer 34 may be deposited on transparent crystalline member 30. Member 30 may be formed from aluminum oxide (sapphire) or other material. Layer 34 may be formed from aluminum oxide and silicon oxide or other materials. The ratio of aluminum oxide to silicon oxide may vary continuously to form an antireflection coating as described in connection with FIG. 4.

At step 56, layer 34 may be annealed. The annealing process may form polycrystalline aluminum oxide adhesion layer 34B and nanocrystals 46 in layer 34A.

At step 58, an optional thin-film filter formed from thin-film dielectric layers (e.g., alternating high index and low index materials) may be formed on layer 34 to help reduce reflections, adjust the color of layer 34, etc.

At step 60, layer 34 may be coated with an optional oleophobic coating or other coating layer 44 (e.g., a fluoropolymer). The surface of layer 34 may also be rendered oleophobic by forming a layer of silicon oxide at the top of layer 34 and/or on top of any additional thin-film filter layers on layer 34.

If desired, the appearance of layer 34 can be adjusted by forming a layer of plasmonic nanoparticles (i.e., plasmonic metal nanoparticles) on surface 38. The plasmonic nanoparticles may, for example, change the apparent color of layer 34. Dopant can also be added to layer 34 to adjust the color of layer 34.

Figure 6:
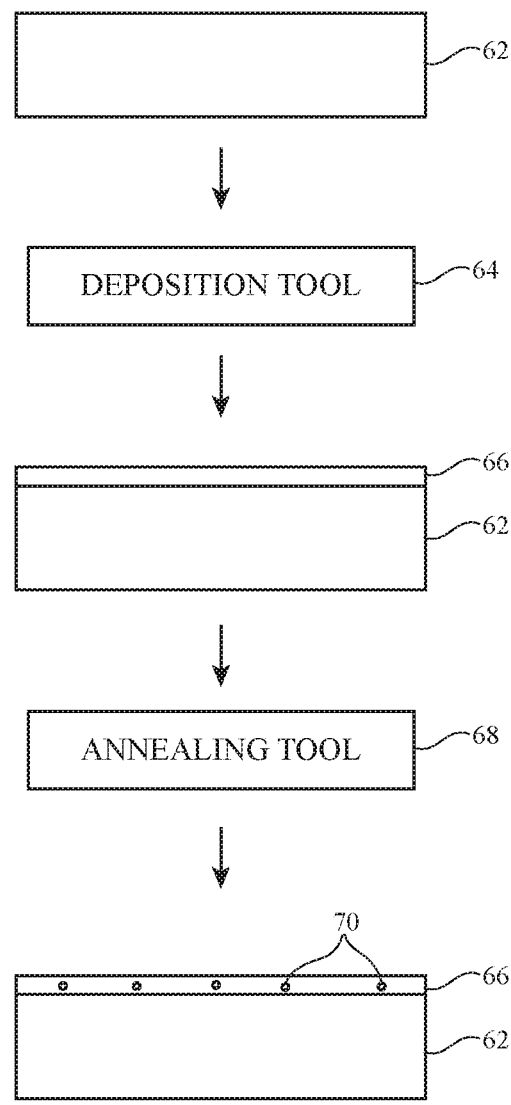
FIG. 6 is a diagram of illustrative equipment and operations involved in forming a colored layer with embedded plasmonic nanoparticles in accordance with an embodiment.

Illustrative equipment and operations for forming a layer with an adjustable color (e.g., a coating layer with plasmonic metal nanoparticles) are shown in FIG. 6. As shown in FIG. 6, a transparent member such as substrate layer 62 (e.g., member 30 and coating 34 or other suitable substrate materials) may be coated with layer 66 using deposition tool 64. Deposition tool 64 may be a physical vapor deposition tool (e.g., a sputtering tool), a chemical vapor deposition tool, or other equipment for forming layer 66 on substrate 62. For example, deposition tool 64 may be a sputtering tool that can sputter metal and/or inorganic dielectric onto substrate 62.

Layer 66 may be a pure metal layer (elemental metal or a metal alloy) or may be formed of cosputtered metal and dielectric. The metal of layer 66 may be, for example, gold, chromium, iron, or other metals. Dielectric for layer 66 may be, for example, an inorganic dielectric such as silicon oxide, zirconium oxide, or other inorganic dielectric material.

After layer 66 has been deposited on substrate 62, substrate 62 and layer 66 may be annealed using annealing tool 68. Annealing tool 68 may, for example, raise the temperature of layer 62 to a sufficiently high temperature (e.g., more than 1000° C., more than 1200° C., more than 1400° C., less than 1600° C., etc.) for a sufficiently long period of time (e.g., more than 1 h, more than 2 h, less than 3 h, etc.) to cause metal nanoparticles 70 to form within layer 66 (e.g., by causing a pure metal layer to pool into nanoparticles of metal and/or by causing metal that is embedded within the cosputtered dielectric of layer 66 to segregate thereby form nanoparticles of metal. Nanoparticles 70 may have diameters of less than 10 nm, more than 5 nm, less than 15 nm, or other suitable size.

Nanoparticles 70 may be sufficiently small to exhibit plasmonic resonances (i.e., nanoparticles 70 may be plasmonic nanoparticles). The plasmonic resonances may impart a color cast to layer 66. For example, layer 66 may appear red, blue, or may have other colors due to the presence of plasmonic nanoparticles 70. Layer 66 may have any suitable thickness (e.g., 10 nm or more, 50 nm or more, 100 nm or more, fewer than 70 nm, etc. If desired colored layers such as illustrative layer 66 of FIG. 6 may be incorporated into structures of the type shown in FIG. 4 (e.g., a layer of plasmonic metal nanoparticles may be formed under layer 44 or may be formed on layer 34 in place of layer 44) to help adjust the apparent color of layer 34 and member 30. If desired, annealing operations used to form plasmonic nanoparticles may be combined with annealing operations used to anneal layer 34.

In addition to adjusting the color of layer 34 using metal plasmonic nanoparticles, dopants may be added to a layer such as layer 34 to adjust the color of layer 34. Zirconia dopant may be added by incorporating zirconium into layer 34 prior to annealing so that zirconia forms when layer 34 is annealed, or dopant may be incorporated into layer 34 by diffusion (e.g., by applying a dopent in a film such as layer 66 of FIG. 6 followed by annealing with tool 68), by ion-implantation, or using other suitable doping techniques. Color-adjusting dopants may be any suitable elements or compounds that impart a color to layer 34. Color-adjusting dopant may be distributed evenly throughout layer 34 or other thin-film layer(s) on member 30 or other substrate layer and/or dopant may be added to the upper surface of layer 34 or other portion of layer 34.

Although sometimes illustrated in the context of sapphire members with graded index coatings of aluminum oxide and silicon oxide, other transparent crystalline materials may serve as transparent members in device 10 and may be coated with other types of graded index material. For example, infrared-transparent materials such as crystalline silicon and crystalline germanium may be used as window materials for infrared light-based devices.

The foregoing is merely illustrative and various modifications can be made to the described embodiments. The foregoing embodiments may be implemented individually or in any combination.

What is claimed is:

1. An electronic device, comprising:
  a housing;
  a component in the housing;
  a transparent crystalline member that overlaps the component, wherein the transparent crystalline member has a first index of refraction; and
  a graded index antireflection layer formed from first and second materials on the transparent crystalline member, wherein the graded index antireflection layer has a first surface that faces the transparent crystalline member and that has the first index of refraction and an opposing second surface having a second index of refraction, wherein the graded index antireflection layer has more of the first material than the second material at the first surface and has more of the second material than the first material at the second surface, and wherein the first and second materials include nanocrystals.

2. The electronic device defined in claim 1 wherein the first material comprises aluminum oxide nanocrystals.

3. The electronic device defined in claim 2 wherein the nanocrystals have diameters of less than 10 nm.

4. The electronic device defined in claim 2 wherein the graded index antireflection layer comprises a polycrystalline aluminum oxide layer that serves as an adhesion layer for the graded index antireflection layer.

5. The electronic device defined in claim 1 further comprising a layer of plasmonic metal nanoparticles on the graded index antireflection layer.

6. The electronic device defined in claim 1 further comprising color-adjusting dopant in the graded index antireflection layer.

7. The electronic device defined in claim 1 wherein the component comprises a camera, wherein the transparent crystalline member comprises a camera window, wherein the transparent crystalline member comprises aluminum oxide, and wherein the graded index antireflection layer has a polycrystalline layer at an interface between the graded index antireflection layer and the transparent crystalline member.

8. The electronic device defined in claim 1 wherein the component comprises:
a display, wherein the transparent crystalline member comprises a transparent display cover layer that overlaps the display; and
an oleophobic coating on second surface of the graded index antireflection layer.

9. The electronic device defined in claim 8 wherein the graded index antireflection layer has a polycrystalline layer at an interface between the graded index antireflection layer and the transparent crystalline member.

10. The electronic device defined in claim 9 wherein the oleophobic coating comprises a polymer layer.

11. The electronic device defined in claim 10 wherein the polymer layer comprises a fluoropolymer layer.

12. The electronic device defined in claim 11 wherein the transparent crystalline member comprises a sapphire layer.

13. Apparatus, comprising:
a transparent sapphire member having an index of refraction;
an oleophobic coating; and
a graded index layer on the transparent sapphire member, wherein the graded index layer extends between the transparent sapphire member and the oleophobic coating, wherein the graded index layer has a first index of refraction at the transparent sapphire member that matches the index of refraction of the transparent sapphire member and has a second index of refraction at the oleophobic coating that is less than the index of refraction of the transparent sapphire member, wherein the graded index layer has a polycrystalline layer at the transparent sapphire member, wherein the graded index layer comprises first and second materials, wherein the first material is different from the second material, and wherein the graded index layer has more of the first material than the second material at the transparent sapphire member and has more of the second material than the first material at the oleophobic coating.

14. The apparatus defined in claim 13 further comprising aluminum oxide crystal particles in the graded index layer.

15. The apparatus defined in claim 14 wherein the first material is aluminum oxide and the second material is silicon oxide.

16. The apparatus defined in claim 15 wherein the oleophobic coating comprises a fluoropolymer.

17. The apparatus defined in claim 16 further comprising:
an electronic device housing; and
a display in the electronic device housing, wherein the transparent sapphire member covers the display.

18. The apparatus defined in claim 16 further comprising:
a camera; and
an electronic device housing, wherein the transparent sapphire layer is mounted in the electronic device housing overlapping the camera and serves as a camera window for the camera.

19. A method, comprising:
depositing a graded index layer having opposing first and second surfaces on a sapphire member with the first surface facing the sapphire member, wherein the graded index layer comprises a composition of aluminum oxide and silicon oxide that smoothly changes throughout the graded index layer, and wherein the graded index layer has more aluminum oxide than silicon oxide at the first surface and has more silicon oxide than aluminum oxide at the second surface; and
annealing the deposited graded index layer to form nanocrystals of aluminum oxide in the graded index layer.

20. The method defined in claim 19 wherein annealing the deposited graded index layer comprises heating the deposited graded index layer to a temperature of greater than 1100° C. to form a polycrystalline layer of aluminum oxide at an interface between the graded index layer and the sapphire member.

* * * * *